US010069992B2

(12) United States Patent
Ionascu

(10) Patent No.: US 10,069,992 B2
(45) Date of Patent: Sep. 4, 2018

(54) METHOD FOR ESTABLISHING A POSITION OF A MEDIA OBJECT ON A FLATBED SURFACE OF A PRINTER

(71) Applicant: OCE-TECHNOLOGIES B.V., Venlo (NL)

(72) Inventor: Felicia G. Ionascu, Venlo (NL)

(73) Assignee: OCÉ-TECHNOLOGIES B.V., Venlo (NL)

(*) Notice: Subject to any disclaimer, the term of this patent is extended or adjusted under 35 U.S.C. 154(b) by 0 days.

(21) Appl. No.: 15/785,998

(22) Filed: Oct. 17, 2017

(65) Prior Publication Data
US 2018/0097956 A1 Apr. 5, 2018

Related U.S. Application Data

(63) Continuation of application No. PCT/EP2016/058761, filed on Apr. 20, 2016.

(30) Foreign Application Priority Data

Apr. 24, 2015 (EP) .................................... 15165100

(51) Int. Cl.
H04N 1/00 (2006.01)
H04N 1/195 (2006.01)
(Continued)

(52) U.S. Cl.
CPC ............ H04N 1/00912 (2013.01); B41J 3/28 (2013.01); B41J 11/008 (2013.01);
(Continued)

(58) Field of Classification Search
CPC ..... B41J 3/28; B41J 11/008; H04N 11/00827; H04N 2201/0082; H04N 2201/0084
(Continued)

(56) References Cited

U.S. PATENT DOCUMENTS 5,642,442 A * 6/1997 Morton ................ G06K 9/2018
382/168
2001/0019401 A1* 9/2001 Irie ......................... G03F 7/707
355/53
(Continued)

FOREIGN PATENT DOCUMENTS

EP      2 803 492 A1    11/2014
JP      2-151702 A       6/1900
WO   WO 2014/207007 A1  12/2014

OTHER PUBLICATIONS

Anonymous, "Matlab—Reconstruct 3D-Coordinates in Camera Coordinate System from 2D-Pixels with side condition—Stack Overflow", XP055217726, May 5, 2012, 3 pages. URL:http://stackoverflow.com/questions/11334012/reconstruct-3d-coordinates-in-camera-coordinate-system-from-2d-pixels-with-sid?lq=1, retrieved on Oct. 1, 2015.
(Continued)

Primary Examiner — Huan Tran
Assistant Examiner — Alexander D Shenderov
(74) Attorney, Agent, or Firm — Birch, Stewart, Kolasch & Birch, LLP

(57) ABSTRACT

A method for printing a digital image on a media object lying on a flatbed surface of a printer, the printer comprising a print head for ejecting recording material on the media object, a camera system connected to the control unit and positioned above the flatbed surface, and a control unit for storing a digital image and controlling the printing of the digital image on the media object, the media object having a contour as seen from a point of view of the camera system towards the flatbed surface, a first point having a position on the contour at a particular height with respect to the flatbed surface, and a second point being one of a point of normal projection of the first point on the flatbed surface and a point having another position on the contour than the first point, (Continued)

the second point being at the same height as the particular height of the first point, and the control unit storing a distance between the first point and the second point, the method comprising the steps of capturing a camera image of the flatbed surface by means of the camera system, determining a first image position in the camera image corresponding to the first point, determining a second image position in the camera image corresponding to the second point, deriving an actual position of the first point by means of the position of the camera system, the first image position, the second image position and the stored distance, and printing the digital image on the media object by ejecting recording material on the media object while taking into account the derived actual position of the first point on the flatbed surface.

9 Claims, 5 Drawing Sheets

(51) Int. Cl.
  *B41J 3/28* (2006.01)
  *B41J 11/00* (2006.01)
(52) U.S. Cl.
  CPC ..... *H04N 1/00827* (2013.01); *H04N 1/19594* (2013.01); *H04N 2201/0082* (2013.01); *H04N 2201/0084* (2013.01)
(58) Field of Classification Search
  USPC .......................................................... 347/14
  See application file for complete search history.

(56) References Cited

U.S. PATENT DOCUMENTS

| | | | |
|---|---|---|---|
| 2005/0122495 A1* | 6/2005 | Kaplan | G03F 7/70258 355/52 |
| 2009/0136119 A1* | 5/2009 | Kinjo | G03F 7/70291 382/145 |
| 2014/0268257 A1* | 9/2014 | Matsuda | B42D 9/04 358/498 |

OTHER PUBLICATIONS

International Search Report for PCT/EP2016/058761 (PCT/ISA/210) dated Jun. 28, 2016.
Written Opinion of the International Searching Authority for PCT/EP2016/058761 (PCT/ISA/237) dated Jun. 28, 2016.
Prematunga et al., "Finding 3D Positions from 2D Images Feasibility Analysis", ICONS 2012: The Seventh International Conference on Systems, XP055083708, ISBN: 978-1-61-839767-6, Apr. 1, 2012 , pp. 214-217. URL:http://www.google.nl/url?sa=t&rct=j&q=&esrc=s&source=web&cd=1&sqi=2&ved=OCCAQFjAAahUKEwjYgKSyhJ_IAhWBvxoKHWNyBnA&url=http%3A%2F%2Fwww.thinkmind.org%2Fdownload.php%3Farticleid%3Dicons_2012_11_10_90008&usg=AFQjCNH5187VKMq12-cV8WFpoZZwGeD8rg&sig2=jr-aJrPVtilwbwPTd5GbSw&bvm=bv.103627116,d.bGQ&cad=rja, retrieved on Oct. 14, 2013.

* cited by examiner

METHOD FOR ESTABLISHING A POSITION OF A MEDIA OBJECT ON A FLATBED SURFACE OF A PRINTER

CROSS REFERENCE TO RELATED APPLICATIONS

This application is a Continuation of PCT International Application No. PCT/EP2016/058761, filed on Apr. 20, 2016, which claims priority under 35 U.S.C. 119(a) to patent application Ser. No. 15/165,100.7, filed in Europe on Apr. 24, 2015, all of which are hereby expressly incorporated by reference into the present application.

FIELD OF THE PRESENT INVENTION

The present invention relates to a method for printing a digital image on a media object lying on a flatbed surface of a print system, the print system comprising a print head for ejecting recording material on the media object, a camera system connected to the control unit and having a position above the flatbed surface, and a control unit for storing a digital image and controlling the printing of the digital image on the media object, the media object having a contour as seen from a point of view of the camera system towards the flatbed surface, and the control unit being configured to store at least one distance between a pair of points of the media object.

The present invention also relates to a flatbed printer comprising a flatbed surface for placing a media object to be printed upon, a control unit for controlling the printing of a digital image on the media object, a print head for ejecting recording material on the media object, the print head relatively movable with respect to the flat bed surface. The control unit is configured to execute the method according to the present invention.

The present invention further relates to a computer program product, including computer readable code embodied on a computer readable medium, said computer readable code comprising instructions for generating a print according to the method of the present invention.

The print head of the flat bed printer may be mounted on a gantry above the flatbed surface. In case of a gantry, the gantry may be moving over the flat bed surface in a first direction, while the print head is movable along the gantry in a second direction perpendicular to the first direction. In case of a print head having a same width as the flat bed surface, the print head may be moving in one direction over the flat bed surface. The control unit is connected to the print head for controlling the print head. The control unit is also controlling the movement of the print head over the flat bed surface. The distance from the print head to the flat bed surface may be variable in order to allow the printing of 3D images.

The recording material may be hot melt ink or a UV curable ink. When the latter ink is used, the print head is also provided with UV lamps for curing the recording material when ejected on the media object placed on the flatbed surface. The flatbed surface usually has the form of a rectangle, for example of a width of 1.22 m and a length of 1.22 m, or of a width of 1.22 m and a length of 2.44 m.

A media object with dimensions in the plane of the flat bed surface smaller or equal to the dimensions of the flat bed surface can be placed on the flat bed surface. The media object has a certain height in a direction perpendicular to the flat bed surface. Flat bed print systems usually apply recording material, like colorants, on a media object placed on the flat bed in the form of toner or ink according to a digitally defined, two-dimensional pattern of pixels with values that indicate a composition of these colorants. This pattern is generated out of a digital image, that may comprise objects in either vectorized or rasterized format, using conventional techniques like interpretation, rendering, and screening by a raster image processor. The processing of a digital image includes color management to convert color values of the pixels in the digital image into composition values related to the printer color space as is set up by the colorants of the print system. Depending on the intended print quality and the characteristics of the print process, the pixels of the pattern may be printed in more than one pass, wherein a position of the media object on the flat bed has an opportunity to receive a colorant in one or more of the passes of the print head across the flat bed.

BACKGROUND OF THE PRESENT INVENTION

An operator may place three-dimensional media objects on the flatbed surface in order to print images on the media objects according to digital images which have been offered to the control unit.

The flatbed printer comprises a camera system connected to the control unit and positioned above the flatbed surface. The camera system comprises a camera above the flat bed surface at a predetermined height from the flat bed surface. The camera is calibrated to take pictures of the flat bed surface. Each location in a picture taken by the camera corresponds to a position in the plane of the flat bed surface. A non-linear calculation executed by image processing means in the control unit couples a pixel in the picture to a position of the flat bed surface. The image processing means is configured to analyse the picture of the flat bed surface in order to detect a media object placed on the flat bed surface. A contour of the media object may also be detected by the image processing means. By the contour of the media object is meant the contour that is visible from the camera point of view. Actual coordinates of points corresponding to points in the picture on the contour of the media object on the flat bed surface may be calculated by the control unit. Pair of points of the media object may be selected in order to store a distance between points of the pair. The stored distance may characterize a height of the media object, a width of the media object, a length of the media object or a diameter of the media object.

However, if the media object has a certain substantial height in the direction perpendicular to the flat bed surface, calculated coordinates of a point of the media object are not accurate and deviate from the real coordinates of the point. As a consequence, when ejecting marking material from the print head towards the media object, recording material may land beside the media object on the flat bed surface or an upper area of the media object along a part of the contour of the media object may be detrimentally unprinted. This will lead to pollution of the flatbed surface or to degradation of the print quality of the print on the media object.

It is an object of the present invention to achieve an increase of the print quality of a print on a media object if the media object has a substantial height in the direction perpendicular to the flat bed surface.

SUMMARY OF THE PRESENT INVENTION

The object may be achieved by the method according to the present invention, wherein the method comprising the steps of capturing a camera image of the flatbed surface by means of the camera system, determining a first image position in the camera image corresponding to a first point of the media object, the first point having a position on the contour at a particular height with respect to the flatbed surface, determining a second image position in the camera image corresponding to a second point of the media object, the second point and the first point having a distance which is stored in the control unit, deriving an actual position of the first point and the second point by means of the position of the camera system, the first image position, the second image position and the stored distance between the first point and the second point, printing the digital image on the media object by ejecting recording material on the media object while taking into account the derived actual position of the first point on the flatbed surface.

The inventor has realized that the actual position of the first point is derivable from the position of the camera system, the first image position, the second image position and the stored distance between the first point and the second point. Coordinates of the first image position and the second image position on the captured camera image—in pixels— are transformed into actual coordinates—in for example mm—on the flat bed surface. The transformation may be based on a calibration matrix that the control unit has constructed beforehand and will not further expatiated upon.

According to an embodiment the second point is a point of normal projection of the first point on the flatbed surface and the first image position equals the second image position. The distance between the first point and the second point may be characterized as the height of the media object.

According to an embodiment the particular height of the actual position of the first point with respect to the flatbed surface is a stored height of the media object.

According to an embodiment the second point is another point having another position on the contour than the first point, the second point being at the same height as the particular height of the first point.

According to an embodiment the stored distance between the first point and the second point is one of a length, a width or a diameter of the media object. This embodiment is advantageous if the height of the media object is not known or varies in case of a plurality of media objects having a same shape, size and/or contour. The height may be derived from the stored distance, the camera position, the first image position and the second image position. The derived height can be used to move a print head in a direction perpendicular to the flat bed surface to an appropriate height for printing on the media object taking into account the derived height of the media object. In case of a plurality of media objects of the same shape, size and/or contour a height may be derived for each media object and a maximum may be calculated from the plurality of derived heights. The maximum height may be used to position the print head at an appropriate height over the plurality of media. In this way the appropriate height is a save height in the sense that a touch of any of the media objects by the print head will be avoided.

According to an embodiment the method comprises the step of detecting the value of the height of the first point by means of a height sensor of the print system, the height sensor being attached to the print system above the flatbed surface.

According to an embodiment the print system comprises a user interface and the method comprises the step of receiving the distance between the first point and the second point as user input by means of the user interface as to store the received distance in storing means of the control unit.

The present invention also relates to a flatbed printer comprising a flatbed surface for placing a media object to be printed upon, a control unit for controlling the printing of a digital image on the media object, a print head for ejecting recording material on the media, the print head movable over the flat bed surface, and a camera system connected to the control unit and positioned above the flatbed surface, the camera system comprising at least one camera for capturing a camera image from the flatbed surface, wherein the control unit comprises image processing means for detecting a contour of a media object placed on the flatbed surface by means of the at least one camera of the camera system, for determining a first image position in the camera image corresponding to a first point having a position on the contour at a particular height with respect to the flatbed surface and for determining a second image position in the camera image corresponding to a second point, the second point and the first point having a distance stored in the control unit, wherein the image processing means is configured to derive an actual position of the first point by means of the position of the camera system, the first image position, the second image position and the stored distance, and the control unit is configured to print the digital image on the media object by ejecting recording material on the media object while taking into account the derived actual position of the first point.

The second point may be one of a point of normal projection of the first point on the flatbed surface and another point having another position on the contour than the first point, the other point being at the same height as the particular height of the first point.

The present invention also relates to a recording medium comprising computer executable program code configured to instruct a computer to perform a method according to the present invention.

Further scope of applicability of the present invention will become apparent from the detailed description given hereinafter. However, it should be understood that the detailed description and specific examples, while indicating preferred embodiments of the present invention, are given by way of illustration only, since various changes and modifications within the scope of the present invention will become apparent to those skilled in the art from this detailed description.

BRIEF DESCRIPTION OF THE DRAWINGS

Hereinafter the present invention is further elucidated with references to the appended drawings showing non-limiting embodiments and wherein.

DETAILED DESCRIPTION OF EMBODIMENTS

Figure 1:
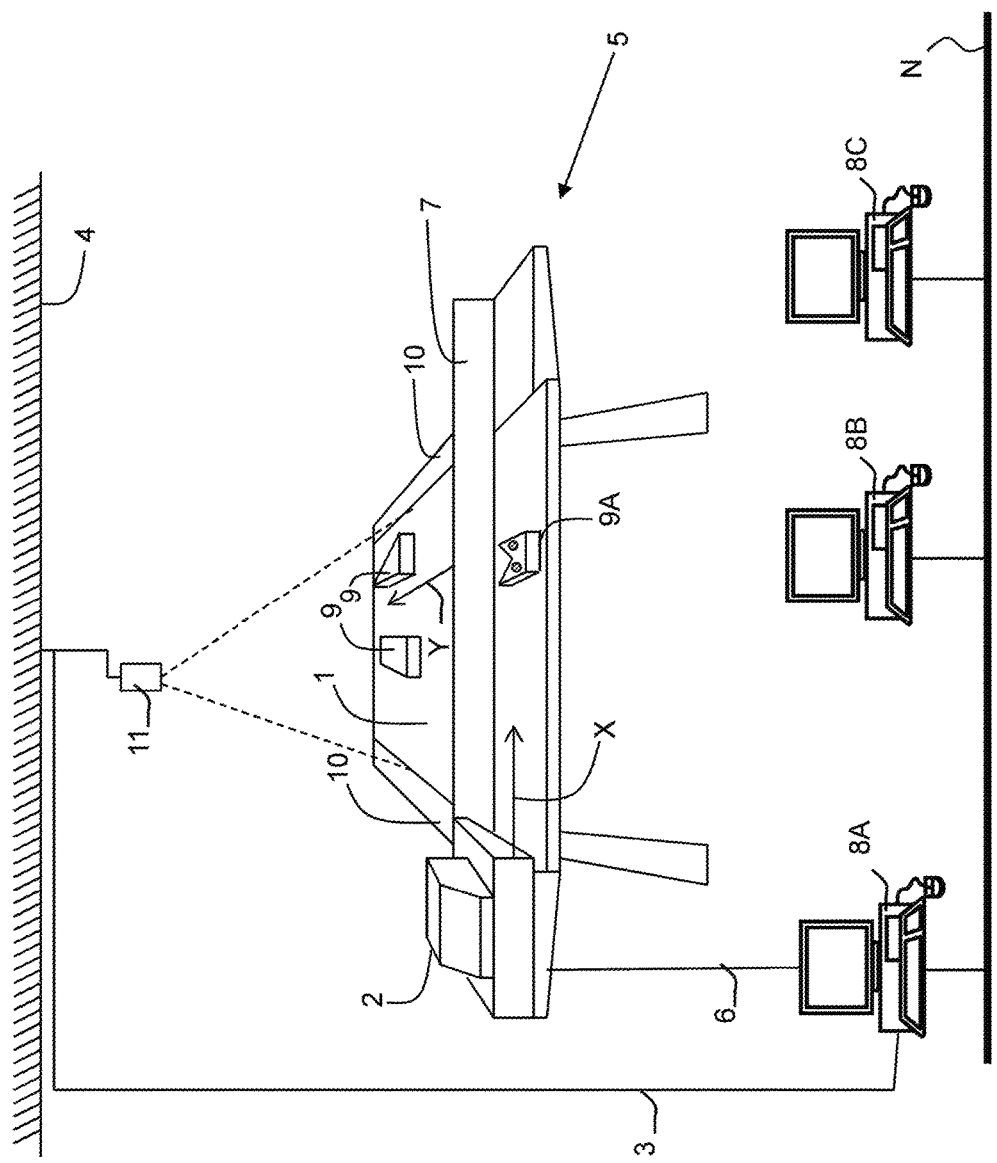
FIG. 1 shows a print system configured to apply the invented method.

FIG. 1 shows a print system 5 comprising a number of workstations 8B, 8C, which may be personal computers, remote devices, mobile devices or other devices for preparing image data for prints to be printed. These workstations have access to a network N for transferring the image data to a print controller 8A that is configured to receive print jobs for prints and derive pass images. The print controller 8A may be part of the print system 5 that further comprises a print head 2 for applying colorants, for example cyan (C), magenta (M), yellow (Y), black (K) and white (W) colorant, or varnish to media objects 9, 9A of a certain height placed on a flat bed surface 1 in order to obtain a printed image on the media objects 9, 9A. The flat bed surface 1 is the surface of the flat bed which is at least partially printable by the print head 2. It is noted that the media objects may be of an arbitrary shape and at an arbitrary position on the flat bed surface 1. The media objects may be so small that they are completely placed on the flat bed surface 1 and have a height that is convenient for the perpendicular distance of the print head 2 to the flat bed surface 1. A first media object 9A has already been printed upon, while the other media objects 9 are not provided with any recording material yet. The print head 2 reciprocally scan the flat bed surface 1 in the second direction X along a gantry 7 perpendicular to a first direction Y of the gantry 7 over the flat bed surface 1 along guiding parts 10. During printing of an image on the media object 9, 9A the media object 9, 9A is not moved on the flat bed surface 1. This way of working is advantageous for rigid media objects. A material of the media objects 9, 9A may be paper, wood, glass, plexi-glass, plastic, board, textile, etc. A print head which is as wide as the flat bed surface may also be envisaged within the scope of the present invention. Such a print head may be moveable in at least one direction over the flat bed surface 1.

Above the flat bed surface 1 a camera system is placed which is connected via a wired or wireless (not shown) network connection 3 with the print controller 8A. The camera system comprises at least one camera 11. The camera system is, for example, attached to the ceiling 4 of a room in which the print system 5 resides. Other bodies for attaching the camera system like a framework or a pole may be envisaged. The camera system may also be attached to the print head or to the gantry. The reach of the at least one camera 11 is at least the whole flat bed surface 1 as indicated by dashed lines in FIG. 1. The reach of the at least one camera 11 may be extended to the guiding parts 10. The camera system is calibrated with respect to a focal length, an optical centre, a pixel ratio and radial and tangential distortions. The camera may be for example set to full HD (1080 Pixels). Determining a position of a media object may be for example established up to 0.3 mm in average. The camera optical centre may be for example approximately 226 cm above the flat bed surface. According to another embodiment digital images are projected on the flatbed surface by means of a projector (not shown) near the camera and afterwards media objects 9, 9A are placed on the flatbed surface, for example at the locations of the projected digital images. Then the media objects 9, 9A are detected by the camera 11.

The printer comprises a user interface which, in this embodiment, is integrated in printer controller 8A for selecting a print job and optionally adapting a print job parameter, such as a print mode which controls the number of passes over a given swath on the media object. In another embodiment a user interface is provided as a network site that is accessible with a browser on a client computer.

After sending a print job comprising image data from a workstation to the printer controller 8A, the print job will be made visible on the user interface. It may be scheduled for further processing after selection from a list of print jobs or, alternatively, if the print job is at the head of the list of print jobs. The print job comprises parameter values that determine the way the image data are to be printed, such as the manner the image data are to be converted into print data.

Figure 5:
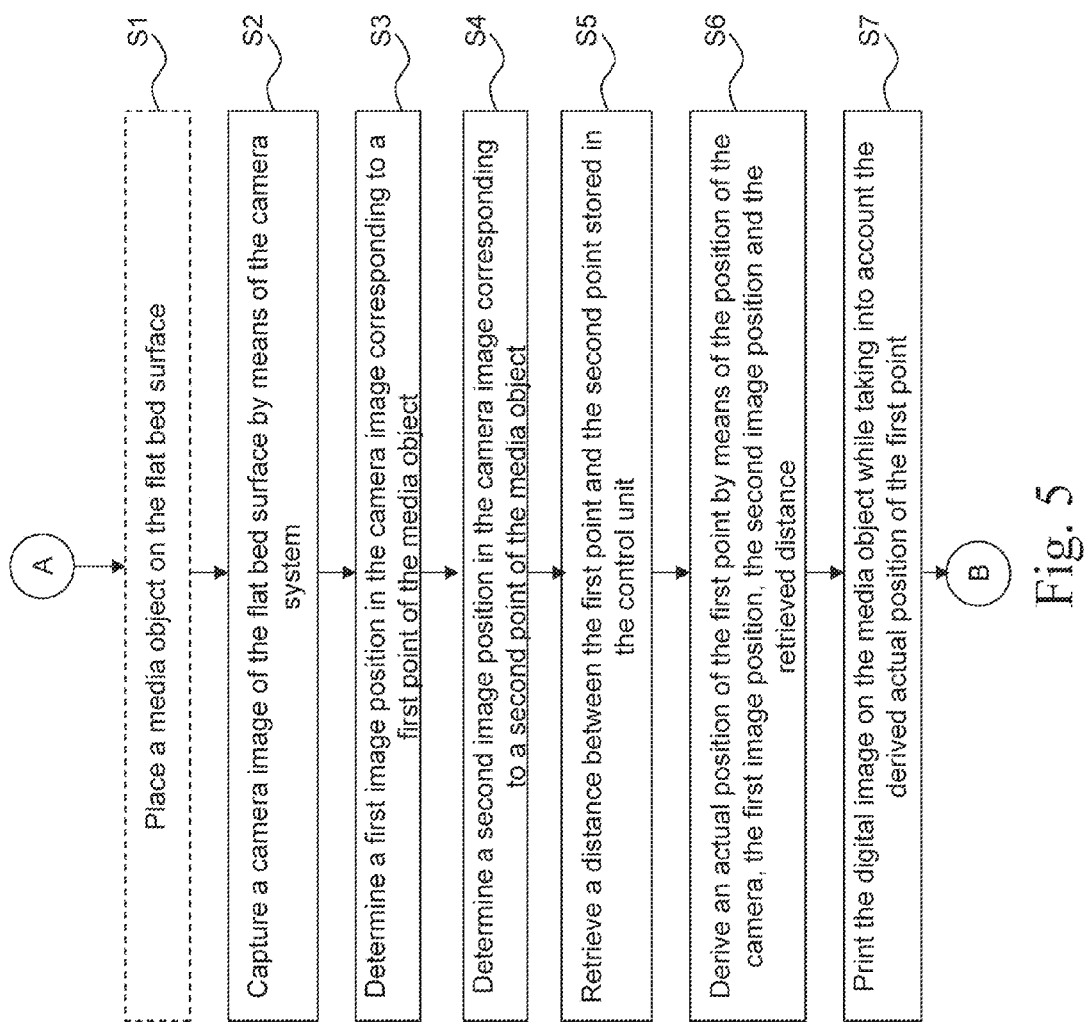
FIG. 5 is a flow diagram of an embodiment of a method according to the present invention.

An embodiment of the method according the present invention will be explained by means of a flow diagram shown in FIG. 5.

A first step S1 may be executed by the operator indicated by the dashed rectangle block, while the other steps S2, S3, S4, S5, S6, S7 may be executed by means of the print system 5 in FIG. 1.

In the first step S1 the operator or placing device places at least one media object (for example the media objects 9, 9A of FIG. 1) on the flat bed surface 1. The camera 11 which may be switched on when the printer system 5 is switched on, registers every placing of a media object on the flat bed surface 1. The registering signals are sent to the printer controller 8A by means of the connection 3. The printer controller 8A comprises an image processing component (not shown) which generates a first digital camera image of the flat bed surface 1 and everything in the reach of the camera 11 towards the flatbed surface 1. Parts of the camera image represent the media objects placed on the flat bed surface 1. The image processing component comprises software for detecting the media objects in the first digital camera image, in particular the contour of the media object 9, 9A. The media objects 9, 9A may be placed according to—aligned to—the directions of an XY plane of the flat bed surface. However, the method according to the present invention is not limited to such an alignment of the media object on the flat bed surface and is applicable to each position of the media object on the flat bed surface.

In another embodiment the flat bed surface 1 is a flat conveyor belt construction on which the media objects are automatically placed by a robotic device. Another image processing component may be used to create a set of digital images when registering the moving media objects on the belt. In this embodiment the gantry 7 may be stationary in the second direction Y while the print head of the print engine 2 is as wide as the length of the gantry across the belt as to be able to eject recording material along the whole surface of the conveyor belt.

In a second step S2 a first digital camera image of the flat bed surface 1 is captured by means of the camera 11. A shape, position, size and contour of a detected media object is derived from the first digital camera image by means of the image processing component. The shape, position, size and contour of the detected media object are stored in memory of the printer controller 8A for later use. As soon as the shape and position of the media object in the first digital camera image is derived, a second digital camera image may be composed showing the contour of the detected media object in a color deviating from the color of the flat bed surface 1 and deviating from the color of the media object as detected on the flat bed surface 1. The composition of the second digital camera image may be realized by known erosion image processing techniques for extracting a boundary of a geometric two-dimensional object. The description of the second step S2 so far comprises one media object, but the detection of multiple media objects placed on the flat bed surface 1 is within the scope of the method according to the present invention.

Preferably, the camera captures the entire media object. However, the method of the present invention also holds when the camera captures at least a part of the media object, which part comprises the first point when the height has been stored and comprises the first point as well as the second point when the length, width, diameter, i.e. the distance between the first point and the second point, has been stored.

When analyzing the first digital camera image projected points having height zero—at the flat bed surface—are not considered as part of the contour, even if the projected points are visible in the first digital camera image. This consideration may be for example based on light reflections on faces of the media object. A light reflection on a face of the media object perpendicular to the flat bed surface is different from a light reflection on a face of the media object parallel to the flat bed surface. The difference in light reflection may be used to detect the high points forming the contour of the media object. A hole in the upper surface of the media object may be detected as an internal contour at which the method according to the present invention may also be applied.

In a third step S3 a first image position in the first digital camera image is determined corresponding to a first point of the media object. The position of the first point of the media object in the first digital camera image is a position on the contour at a particular height of the media object as seen from a point of view of the camera system towards the flat bed surface. Preferably the first point is determined to be according to a corner point of the contour of the media object in the first digital camera image since a position of a corner point is relatively easy to derive from the contour of the media object in the first digital camera image.

In a fourth step S4 a second image position in the first digital camera image is determined corresponding to a second point of the media object. Preferably the second point is determined to be according to a corner point of the contour of the media object in the first digital camera image since a position of a corner point is relatively easy to derive from the contour of the media object in the first digital camera image.

In a first embodiment the second point is a point of normal projection of the first point on the flat bed surface. The distance between the first point and the second point characterizes the height of the media object.

Figure 2:
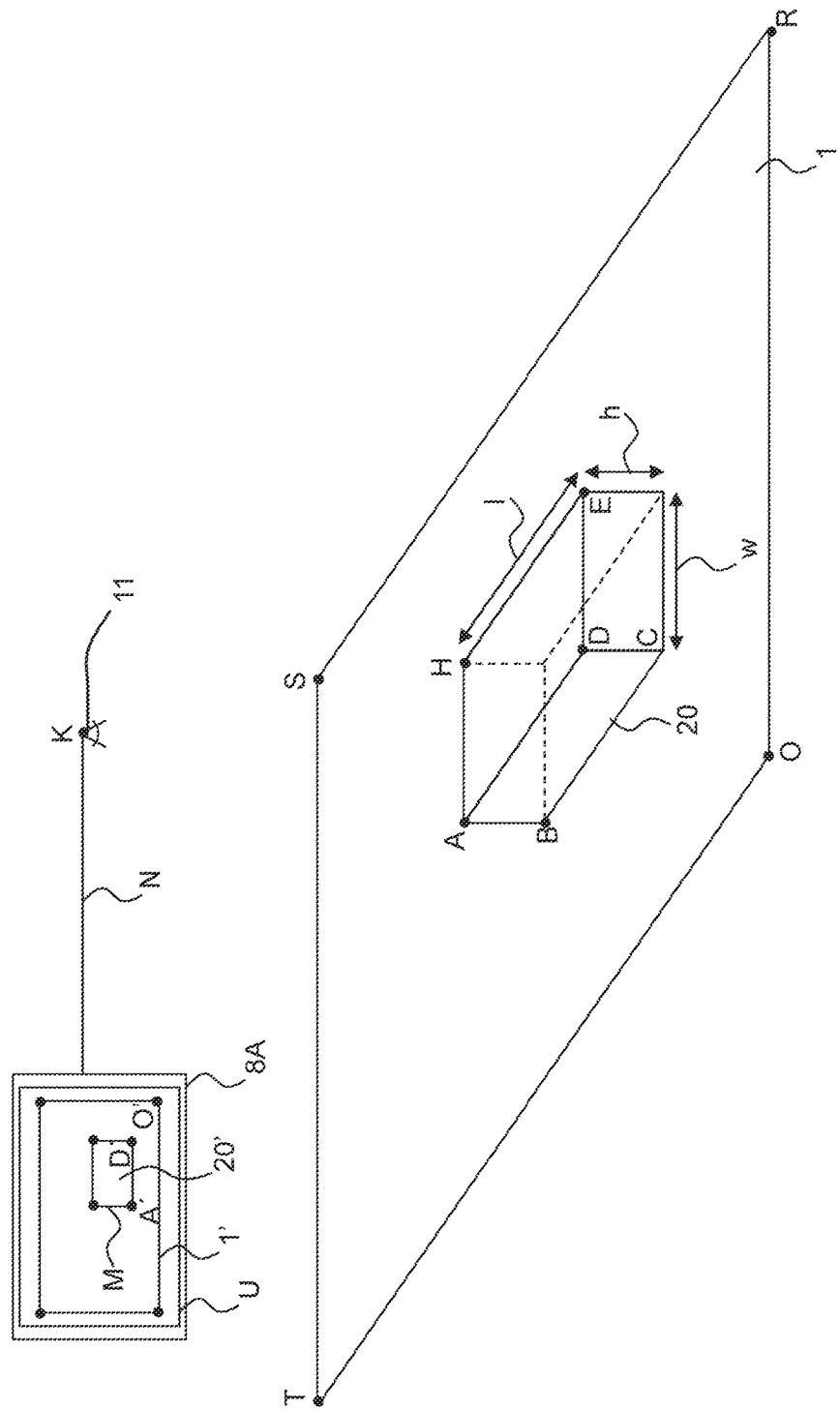
FIGS. 2-4 are schematic views of a media object positioned on the flat bed surface of a print system according to the present invention.

FIG. 2 shows a media object 20 on the flat bed surface 1, and the first point A and the second point B which are determined according to the first embodiment. The height h of the media object 20 is stored in the control unit, i.e. the distance AB between the first point A and the second point B is known to the print system—stored in storing means in the control unit of the printing system according to the present invention—as the height h of the media object 20. The media object 20 is captured by the camera 11 positioned at a point K. The camera is configured to submit signals from the camera 11 via a digital network N to workstation 8A. The workstation 8A has a user interface screen U for displaying a first digital camera image derived from the signals. The first digital camera image shown as a box 1' represents the flatbed surface 1 having corners Q, R, S, T. The corner O of the flat bed surface 1 may be used as a table origin in a three-dimensional space having coordinates (0, 0, 0). The first point A is selected as a corner point of the media object 20. However, it is noted that each point of the rectangle ADEH surrounding the upper side of the media object 20 may be selected to be the first point A. The upper side of the media object 20 is represented in the first digital camera image 1' as a surface 20' having an approximately rectangular contour M. For convenience reasons, the media object 20 is a rectangular box having a height h, a width w and a length l. However, the method according to the present invention also applies to other shapes of media objects with a particular height which show an appropriate contour in the corresponding first digital camera image. In other words, the contour of the media object is not restricted to a rectangular shape but may be any contour.

In a second embodiment the second point is another point of the media object than the first point and the second point is represented in the first camera image at another position on the contour of the media object in the first digital image than the position of the first point on the contour of the media object in the first digital camera image. FIG. 2 shows the media object 20 and point A is again the first point and point D is determined to be the second point according to the second embodiment. The second point D is at the same particular height h with respect to the flatbed surface 1 as the first point A. The distance AD between the first point A and the second point D is stored in the control unit. The distance AD may be a size of the media object, in this case a length l of the media object 20. Other choices of the second point B may lead to a distance which is a width of the media object—for example DE or AH—, a side diagonal of the media object—for example AE or HD—, a diameter of the media object in case of a cylindrical media object, etc. The size AD of the media object 20 stored as a distance in the control unit—the length l of media object 20—is substantially proportional to a distance between the position A' of the first point A on the contour M in the first digital camera image 1' and the position D' of the second point D on the contour M in the first digital camera image 1'.

In a fifth step S5 the stored distance between the first point and the second point is retrieved from the storing means in the control unit. According to the first embodiment the stored distance between the first point A and the second point B is the height h of the media object 20. According to the second embodiment the stored distance between the first point A and the second point D is the length l of the media object 20. The stored distances may be input by an operator or user of the printing system via a user interface screen beforehand or when defining or editing a print job, especially when entering the size specifications of the media object to be printed on.

In a sixth step S6 an actual position of the first point will be derived from the position of the camera, the first image position, the second image position and the retrieved distance. The sixth step S6 will be further elucidated below for the first embodiment as mentioned here-above and for the second embodiment as mentioned here-above.

In a seventh step S7 the digital image intended to be printed on the media object is retrieved from storing means in the control unit, for example a print job queue or a data storage in the control unit or remote workstation related to the print jobs in the print job queue. The digital image is printed on the media object while taking into account the derived actual position of the first point. Since the actual position of the first point and the actual position of the second point are known, the print head can be positioned over the media object in order to print on the area inside the contour of the media object.

Figure 3:
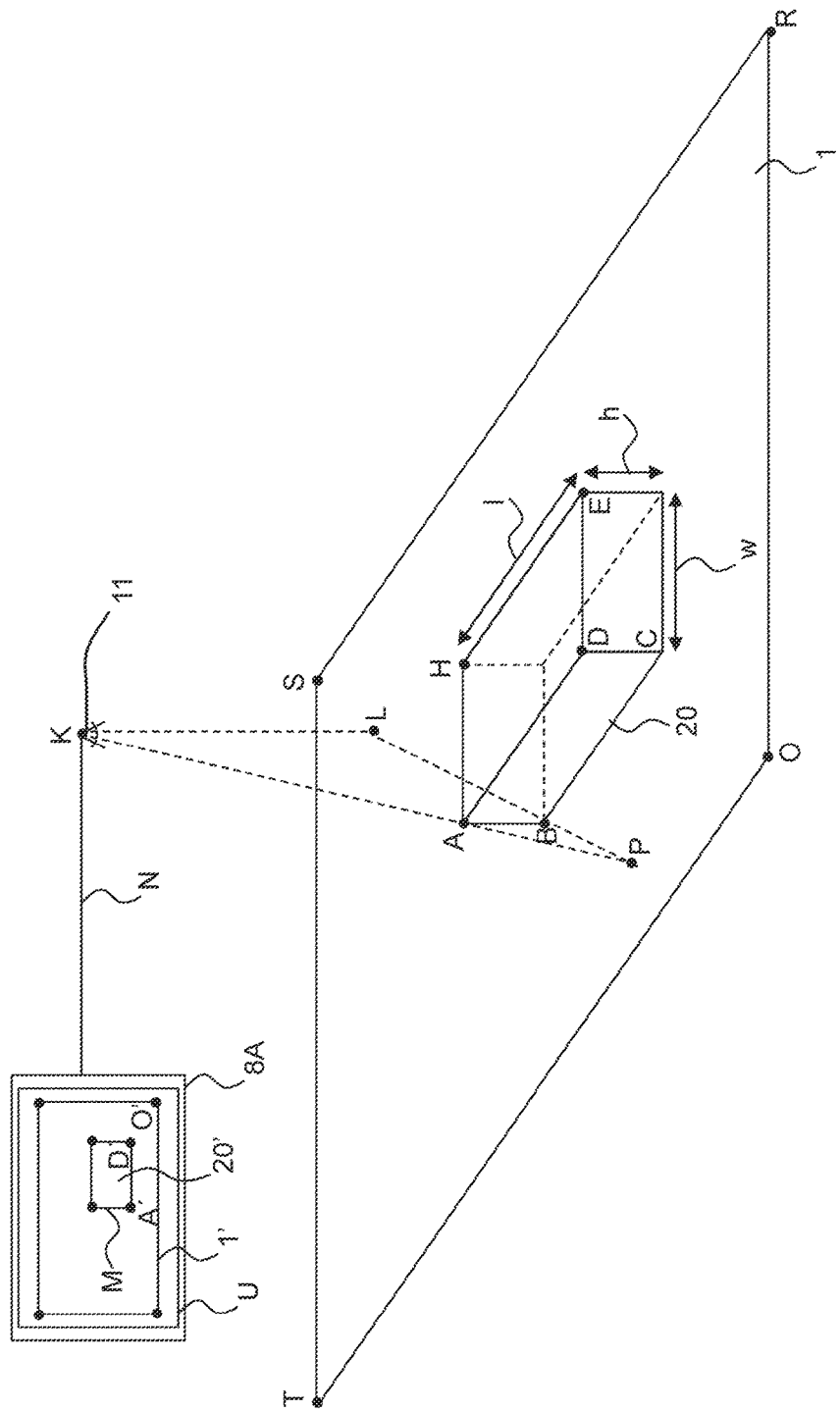

Hereinafter the sixth step S6 will be further elucidated with respect to the first embodiment mentioned here-above by means of FIG. 3. The camera 11 at the position K has a reach over the whole flat bed surface 1 and will register the media object 20. A normal projection of point K on the flat bed surface 1 corresponds to a point L. Since the camera 11 is calibrated based on a constant distance of the line piece KL to the flat bed surface, the first point A will be registered as a projected point P on the flat bed surface 1. Point P is the intersection of a line through line piece KA with the flat bed surface 1. The projected coordinates of registered point A will be the actual coordinates of point P. Since point B is the normal projection of point A on the flat bed surface 1, a line through line piece LB will also contain point P. Also the proportion of distances LB:BP equals the proportion of distances KL:AD equals the proportion of distances AP:AK.

X, Y and Z coordinates of the points K, A, B, P will be established related to origin point O. An X or Y coordinate of digital unit 1 may for example correspond to a unit of 1 mm on the flat bed surface in the direction of an X axis or an Y axis respectively.

The optical centre coordinates of the camera 11 at the position of point K will be assumed to be $(x_0, y_0, z_0)$, where $z_0$ is the distance of the camera 11 to the flat bed surface 1 and are retrievable from storing means of the control unit of the printing system according to the present invention. The actual X and Y coordinates—in mm—of point P are derivable from the coordinates of point A' in the first digital camera image 1' shown in FIG. 3. The coordinates of point P will be assumed to be $(x_p, y_p, 0)$. The coordinates of point A will be assumed to be $(x_a, y_a, z_a)$, where $z_a$ equals the height h of the media object 20. The coordinates of point B are therefore $(x_a, y_a, 0)$.

The line through point K, the first point A and point P can be represented by the following equations:

$$(x-x_0)/(x_a-x_0)=(y-y_0)/(y_a-y_0)=(z-z_0)/(z_a-z_0) \quad (1)$$

$$(x-x_0)/(x_p-x_0)=(y-y_0)/(y_p-y_0)=(z-z_0)/(-z_0) \quad (2)$$

From equations (1) and (2), the following equations can be derived:

$$x_p=x_0-z_0*(x_a-x_0)/(z_a-z_0) \quad (3)$$

$$y_p=y_0-z_0*(y_a-y_0)/(z_a-z_0) \quad (4)$$

From equations (3) and (4), the following equations can be derived:

$$x_a=x_0-(x_p-x_0)(z_a-z_0)/z_0 \quad (5)$$

$$y_a=y_0-(y_p-y_0)(z_a-z_0)/z_0 \quad (6)$$

which deliver the actual x and y coordinates of point A and point B.

Figure 4:
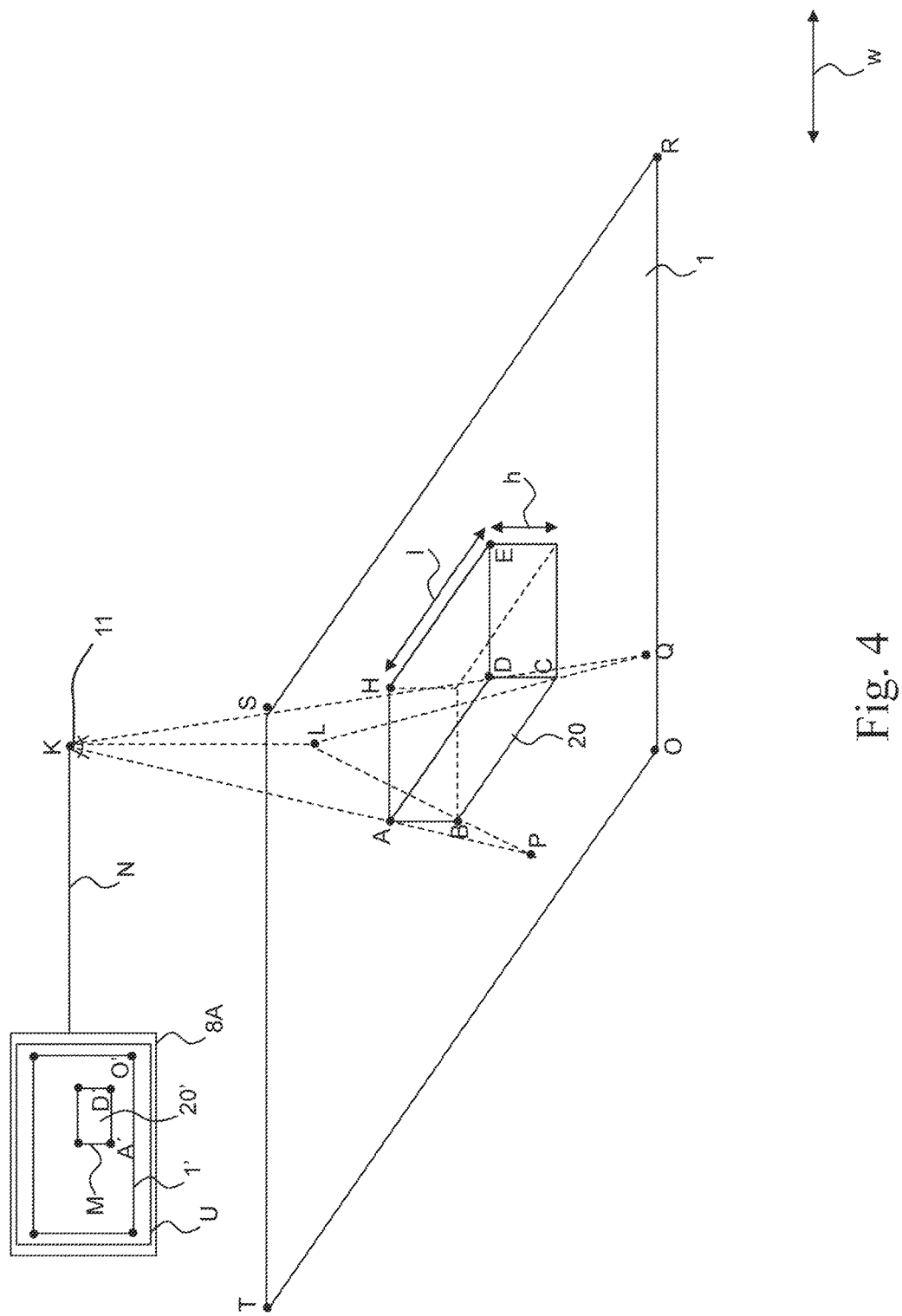

Hereinafter the sixth step S6 will be further elucidated with respect to the second embodiment mentioned hereabove by means of FIG. 4. The camera 11 at the position K has a reach over the whole flat bed surface 1 and will register the media object 20. A normal projection of point K on the flat bed surface 1 corresponds to a point L. Since the camera 11 is calibrated based on a constant distance of the line piece KL to the flat bed surface, the first point A will be registered as a projected point P on the flat bed surface 1 and the second point D will be registered as a projected point Q on the flat bed surface. Point P is the intersection of a line through line piece KA with the flat bed surface 1. The projected coordinates of registered point A will be the actual coordinates of point P. Point Q is the intersection of a line through line piece KD with the flat bed surface 1. Since point B is the normal projection of point A on the flat bed surface 1, a line through line piece LB will also contain point P. Since point C is the normal projection of point D on the flat bed surface 1, a line through line piece LC will also contain point Q. Also the proportion of distances LB:BP equals the proportion of distances KL:AD equals the proportion of distances AP:AK. Also the proportion of distances LC:CQ equals the proportion of distances KL:DC equals the proportion of distances DQ:KD.

X, Y and Z coordinates of the points K, D, C, Q will be established related to origin point O. An X or Y coordinate of digital unit 1 may for example correspond to a unit of 1 mm on the flat bed surface in the direction of an X axis or an Y axis respectively. The optical centre coordinates of the camera 11 at the position of point K will be assumed to be $(x_0, y_0, z_0)$, where $z_0$ is the distance of the camera 11 to the flat bed surface 1 and are retrievable from storing means of the control unit of the printing system according to the present invention. The actual X and Y coordinates—in mm—of point P are derivable from the coordinates of point A' in the first digital camera image 1' shown in FIG. 4. The actual X and Y coordinates—in mm—of point Q are derivable from the coordinates of point D' in the first digital camera image 1' shown in FIG. 4. The coordinates of point P will be assumed to be $(x_p, y_p, 0)$. The coordinates of point Q will be assumed to be $(x_q, y_q, 0)$. The coordinates of point A will be assumed to be $(x_a, y_a, z_a)$, where $z_a$ equals the height h of the media object 20. The coordinates of point B are therefore $(x_a, y_a, 0)$. The coordinates of point D will be assumed to be $(x_d, y_d, z_d)$, where $z_d$ equals the height h of the media object 20. The coordinates of point C are therefore $(x_d, y_d, 0)$.

The line through point K, the first point A and point P can be represented by the following equations:

$$(x-x_0)/(x_a-x_0)=(y-y_0)/(y_a-y_0)=(z-z_0)/(z_a-z_0) \quad (1a)$$

$$(x-x_0)/(x_p-x_0)=(y-y_0)/(y_p-y_0)=(z-z_0)/(-z_0) \quad (2a)$$

From equations (1a) and (2a), the following equations can be derived:

$$x_p=x_0-z_0*(x_0-x_0)/(z_a-z_0) \quad (3a)$$

$$y_p=y_0-z_0*(y_a-y_0)/(z_a-z_0) \quad (4a)$$

From equations (3a) and (4a), the following equations can be derived:

$$x_a=x_0-(x_p-x_0)(z_a-z_0)/z_0 \quad (5a)$$

$$y_a=y_0-(y_p-y_0)(z_a-z_0)/z_0 \quad (6a)$$

The equations (1a), (2a), (3a), (4a), (5a), (6a) used in the second embodiment are equal to the equations (1), (2), (3), (4), (5), (6) used in the first embodiment.

The line through point K, the second point D and point Q can be represented by the following equations:

$$(x-x_0)/(x_d-x_0)=(y-y_0)/(y_d-y_0)=(z-z_0)/(z_d-z_0) \quad (7)$$

$$(x-x_0)/(x_q-x_0)=(y-y_0)/(y_q-y_0)=(z-z_0)/(-z_0) \quad (8)$$

From equations (7) and (8), the following equations can be derived:

$$x_q=x_0-z_0*(x_d-x_0)/(z_d-z_0) \quad (9)$$

$$y_q=y_0-z_0*(y_d-y_0)/(z_d-z_0) \quad (10)$$

From equations (9) and (10), the following equations can be derived:

$$x_d=x_0-(x_q-x_0)(z_d-z_0)/z_0 \quad (11)$$

$$y_d=(y_q-y_0)(z_d-z_0)/z_0 \quad (12)$$

According to the second embodiment the distance between the first point A and the second point D equalling the length l of the media object 20 is stored in the control unit of the print system. The length l of the media object 20 can be expressed in the following equation:

$$l=\mathrm{sqrt}((x_a-x_d)^2+(y_a-y_d)^2) \quad (13)$$

The equalities for $x_a$, $x_d$, $y_a$ and $y_d$ in formulas (5a), (11), (6a) and (12) respectively may be substituted into equation (13) delivering the values of $z_a$ and $z_d$, each being the height h of the media object 20. Since at this stage the height h of the media object is known, the actual X and Y coordinates of the point A, D, B, C—$x_a$, $y_a$, $x_d$, $y_d$, $x_b$, $y_b$, $x_c$, $y_c$ respectively—can be derived by means of the method described in the first embodiment by using equations (5a), (6a), (11) and (12).

It is noted that the equation (13) holds for a media object having an arbitrary position on the flat bed surface. In the case that the media object is aligned with the X axis and the Y axis on the flat bed surface, the equation (13) reduces to the following equation:

$$l = x_a - x_d \tag{13a}$$

For convenience reasons the media object is represented as a rectangular box having a height, a length and a width. However the present invention is not limited to a rectangular box. Other shapes having a constant height and vertical sides may be envisioned in order to apply the sixth step S6 of the method. Top coordinates of the vertical sides characterize the contour of the media object from the camera viewpoint.

The method according to the first embodiment and according to the second embodiment may be repeated for a plurality of first points on the contour of the media object as seen from the camera point of view. In this way the actual contour of the media object is described in actual coordinates in the ORST plane. The actual coordinates of the points on the contour of the media object are communicated to scheduling means of the control unit and driving means of the print head for ejecting recording material on the appropriate positions on the media object.

The above disclosure is intended as merely exemplary, and not to limit the scope of the present invention, which is to be determined by reference to the following claims.

The invention claimed is:

1. Method for printing a digital image on a media object lying on a flatbed surface of a print system, the print system comprising
   a print head for ejecting recording material on the media object,
   a camera system connected to the control unit and having a position above the flatbed surface, and
   a control unit for storing a digital image and controlling the printing of the digital image on the media object,
   the media object having a contour as seen from a point of view of the camera system towards the flatbed surface, and the control unit configured to store at least one distance between a pair of points of the media object, the method comprising the steps of
   a) capturing a camera image of the flatbed surface by means of the camera system,
   b) determining a first image position in the camera image corresponding to a first point of the media object, the first point having a position on the contour at a particular height with respect to the flatbed surface,
   c) determining a second image position in the camera image corresponding to a second point of the media object, the second point and the first point having a distance which is stored in the control unit,
   d) deriving an actual position of the first point and the second point by means of the position of the camera system, the first image position, the second image position and the stored distance between the first point and the second point,
   e) printing the digital image on the media object by ejecting recording material on the media object while taking into account the derived actual position of the first point on the flatbed surface,
   wherein the contour is not restricted to a rectangular shape.

2. Method according to claim 1, wherein the second point is a point of normal projection of the first point on the flatbed surface and the first image position equals the second image position.

3. Method according to claim 2, wherein the particular height of the actual position of the first point with respect to the flatbed surface is a stored height of the media object.

4. Method according to claim 2, wherein the method comprises the step of detecting the value of the height of the first point by means of a height sensor of the print system, the height sensor attached to the print system above the flatbed surface.

5. Method according to claim 1, wherein the second point is another point having another position on the contour than the first point, the second point being at the same height as the particular height of the first point.

6. Method according to claim 5, wherein the stored distance between the first point and the second point is one of a length, a width or a diameter of the media object.

7. Method according to claim 1, wherein the print system comprises a user interface and the method comprises the step of receiving the distance between the first point and the second point as user input by means of the user interface as to store the received distance in storing means of the control unit.

8. Non-transitory recording medium comprising computer executable program code configured to instruct a computer to perform a method according to claim 1.

9. A flatbed printer comprising a flatbed surface for placing a media object to be printed upon, a control unit for controlling the printing of a digital image on the media object, a print head for ejecting recording material on the media, the print head movable over the flat bed surface, and a camera system connected to the control unit and positioned above the flatbed surface, the camera system comprising at least one camera for capturing a camera image from the flatbed surface, wherein the control unit comprises image processing means for detecting a contour of a media object placed on the flatbed surface by means of the at least one camera of the camera system, for determining a first image position in the camera image corresponding to a first point having a position on the contour at a particular height with respect to the flatbed surface and for determining a second image position in the camera image corresponding to a second point, the second point and the first point having a distance stored in the control unit,
   wherein the image processing means is configured to derive an actual position of the first point by means of the position of the camera system, the first image position, the second image position and the stored distance, and the control unit is configured to print the digital image on the media object by ejecting recording material on the media object while taking into account the derived actual position of the first point,
   wherein the contour is not restricted to a rectangular shape.

* * * * *